(12) United States Patent
Andersson

(10) Patent No.: US 6,910,715 B2
(45) Date of Patent: Jun. 28, 2005

(54) STEERING WHEEL ARRANGEMENT FOR A MOTOR VEHICLE

(75) Inventor: Lars-Ove Andersson, Trollhättan (SE)

(73) Assignee: Saab Automobile AG (SE)

( * ) Notice: Subject to any disclaimer, the term of this patent is extended or adjusted under 35 U.S.C. 154(b) by 157 days.

(21) Appl. No.: 10/332,358

(22) PCT Filed: Jun. 29, 2001

(86) PCT No.: PCT/SE01/01509
§ 371 (c)(1),
(2), (4) Date: Jun. 19, 2003

(87) PCT Pub. No.: WO02/02374
PCT Pub. Date: Jan. 10, 2002

(65) Prior Publication Data
US 2004/0012186 A1 Jan. 22, 2004

(30) Foreign Application Priority Data
Jul. 3, 2000 (SE) .................................. 0002509

(51) Int. Cl.⁷ .................................. B62D 1/19
(52) U.S. Cl. .................... 280/777; 280/775; 280/731; 74/493
(58) Field of Search ................ 280/777, 775, 280/731; 74/493

(56) References Cited

U.S. PATENT DOCUMENTS

| 3,481,626 | A | | 12/1969 | Fergle | 280/150 |
|---|---|---|---|---|---|
| 4,337,967 | A | | 7/1982 | Yoshida et al. | 280/777 |
| 4,834,422 | A | | 5/1989 | Oikawa et al. | 280/751 |
| 5,295,712 | A | * | 3/1994 | Omura | 280/777 |
| 5,398,963 | A | * | 3/1995 | Fohl | 280/731 |
| 5,507,521 | A | * | 4/1996 | Steffens, Jr. | 280/775 |
| 5,618,058 | A | * | 4/1997 | Byon | 280/777 |
| 6,189,919 | B1 | * | 2/2001 | Sinnhuber et al. | 280/731 |
| 6,227,571 | B1 | * | 5/2001 | Sheng et al. | 280/777 |

FOREIGN PATENT DOCUMENTS

| DE | 4105821 | | 8/1992 |
|---|---|---|---|
| DE | 43 40 633 A1 | * | 6/1994 |
| DE | 4421509 | | 12/1995 |
| WO | WO 98/10960 | | 3/1998 |
| WO | WO 99/58389 | | 11/1999 |

* cited by examiner

Primary Examiner—Ruth Ilan
(74) Attorney, Agent, or Firm—Ostrolenk, Faber, Gerb & Soffen, LLP

(57) ABSTRACT

In a steering wheel arrangement for motor vehicles, in which a steering column (5) provided with a steering wheel (4) is pivotally supported in a holder (6) in the vehicle, the steering wheel (4) together with a first section (7) of the steering column can be moved closer to the driver of the vehicle in the event of a collision. This is achieved by means of a drive device comprising a working chamber (13) intended to act upon the first section (7) of the steering column, to which chamber a gas generator (21) is connected, which is designed to be activated in the event of a collision in order to deliver propellant gas to the working chamber (13), thereby moving the steering wheel and steering column. During the movement the steering wheel may also be lowered. The gas generator (21) may also deliver gas to an airbag (20) fitted in the steering wheel (4).

7 Claims, 2 Drawing Sheets

STEERING WHEEL ARRANGEMENT FOR A MOTOR VEHICLE

TECHNICAL SPHERE

The invention relates to a steering wheel arrangement for a motor vehicle.

PRIOR ART

It is nowadays usual to provide passenger cars with a steering wheel-mounted airbag in order to reduce the risk of injury to the driver in the event of a crash, especially where the latter has neglected to use a seat belt. The airbag helps to distribute the load stress on the driver, so that unduly high local load stresses on the driver do not occur. For effective load absorption the steering wheel suspension is usually designed to absorb kinetic energy of the driver.

One problem in this context is that a driver not wearing a seat belt has time to reach a high velocity before contact with the airbag occurs, resulting in a poor absorption of the force. Some steering wheel units are also designed to automatically move the steering wheel away from the driver in the event of a crash in order to reduce the risk of a driver, who is not wearing a seat belt, striking his/her head against the steering wheel. Such an arrangement increases the risk of injuries to a driver not wearing a seat belt, since a longer time elapses before the driver comes into contact with the airbag.

Moving the steering wheel toward the driver whilst at the same time lowering the steering wheel, in order to reduce the risk of injury to a driver not wearing a seat belt, is already known. This is achieved in that the driver's body partially manages to slide down under the steering wheel, so that the driver's knees come into contact with an operating device and by means of the latter move the steering wheel, placing it in a more favorable position when the driver shifts forward. A disadvantage with this solution is that the driver has already had time to shift forward before the steering wheel is moved.

OBJECT OF THE INVENTION

The object of the invention is to be able to reduce the injuries to a driver in a vehicle in the event of a crash.

DESCRIPTION OF THE INVENTION

The chosen design makes it possible to promptly move both the steering wheel and the airbag closer to the driver during a collision, so that the airbag can arrest the driver at an earlier stage than hitherto, thereby reducing the risk of injury to the driver. Another advantage to this is that the action of the airbag can be made less aggressive, so that the risk of injury to a belted driver can be further reduced.

By also lowering the steering wheel promptly during the collision the risk of injuries sustained through impact with the steering wheel is further reduced.

Further characteristics and advantages of the solution according to the invention are set out in the description and other claims.

The invention will be described in more detail below with reference to exemplary embodiments shown in the drawing attached.

DESCRIPTION OF EXEMPLARY EMBODIMENTS

Figure 1:
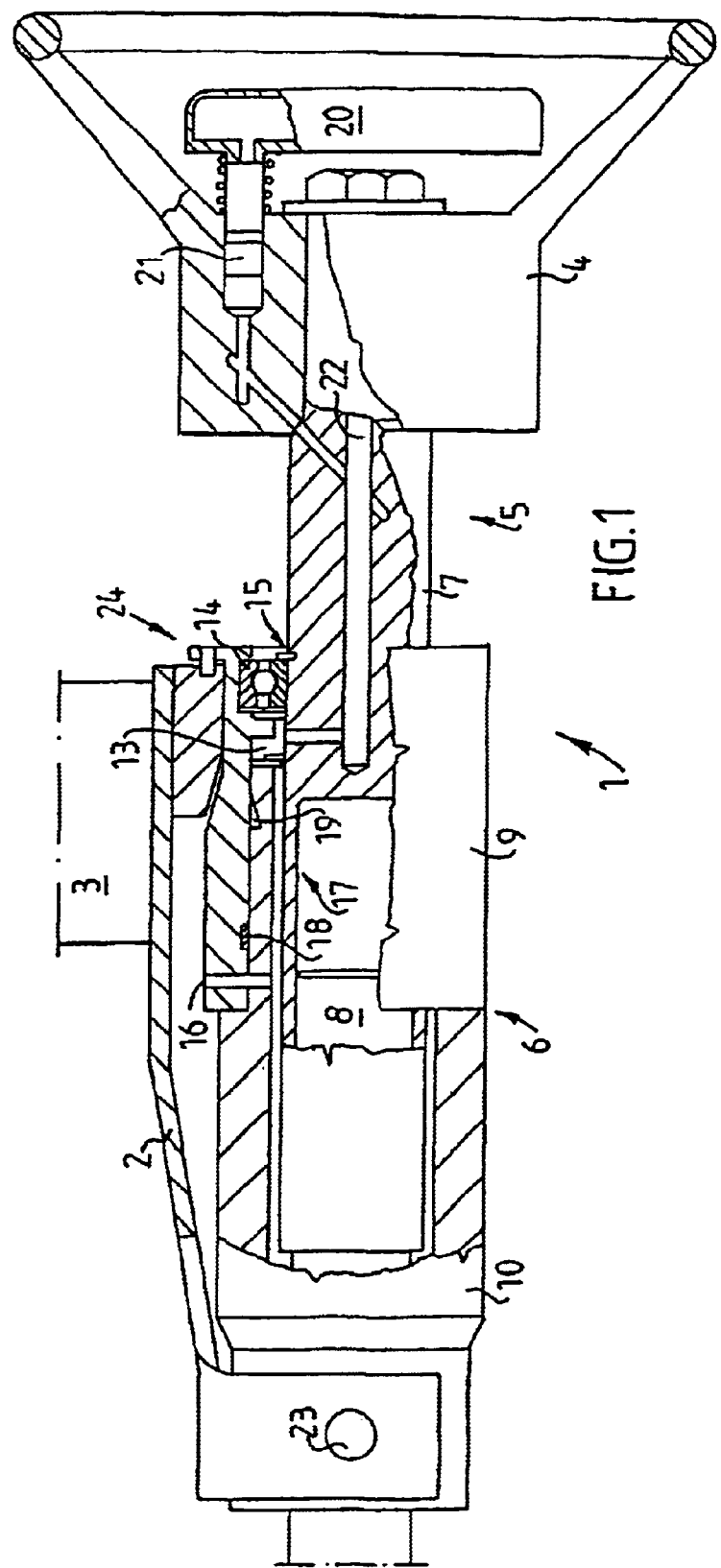
FIG. 1 shows a partially sectional view of a steering wheel arrangement according to the invention in the normal position.
Figure 2:
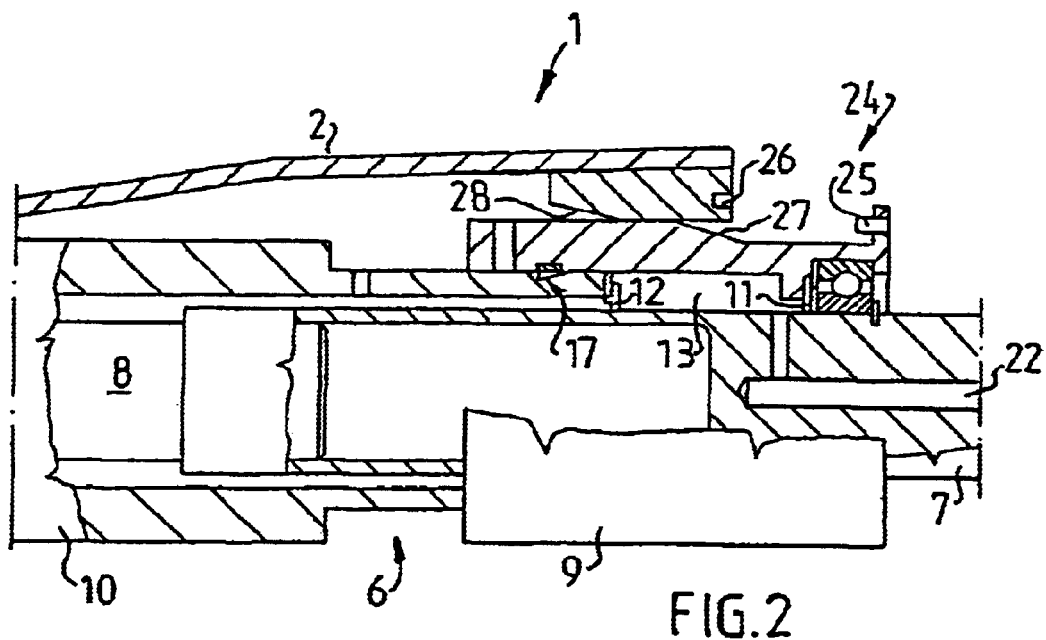
FIG. 2 shows a section of the steering wheel arrangement in FIG. 1 in the activated position.

In an exemplary embodiment shown in FIGS. 1 and 2 a steering wheel arrangement 1 intended for a passenger car is fitted in a mounting 2, which is in turn supported by a steering box 3, which is transversely mounted in a vehicle, which is not shown in more detail here. Forming part of the steering wheel arrangement 1 is a steering wheel 4, which is mounted on a steering column 5, which is pivotally mounted in a holder 6, itself fixed in the vehicle by means of the mounting 2.

The steering column 5 is of telescopic construction with a first section 7 on which the steering wheel 4 sits, and a second section 8, which is inserted in the first section 7 and is connected by conventional means to a steering mechanism. Said sections 7 and 8 are torsionally connected to one another, by means of suitable splines, for example. The holder 6 is also of telescopic construction and has a first part 9, into which a second part 10 is introduced. Both of these parts 9 and 10 tightly enclose the first section 7 of the steering column, each with their respective seals 11 and 12, and together with the first section 7 of the steering column 5 define a working chamber 13 extending around this section.

The first section 7 of the steering column is pivotally mounted in the first part 9 of the holder 6 by way of a bearing 14 axially fixed therein, and is axially locked relative to said first part 9 by means of a catch 15, as here, for example, in the form of locking rings interacting with the first section 7 of the steering column and with the bearing 14. In the normal position shown the first part 9 and the second part 10 in the holder 6 are also axially interlocked by means of a first locking device 16, suitably in the form of one or more fracture pins that will withstand normal tensile force in the steering wheel 4, but which are intended to fracture in the event of a collision. There is also a second locking device 17, the function of which is to prevent the steering wheel 4 being returned to the normal position once it has been axially moved from the normal position shown. The said second locking device 17 includes a locking ring 18 arranged on the inside of the first part 9 of the holder 6, the ring being intended, when situated directly opposite a slot 19 arranged on the outside of the second part 10 of the holder 6, to snap into the said slot, thereby locking the parts axially.

An airbag 20 with an associated gas generator 21 for inflating the airbag is fitted in the steering wheel 4. Said gas generator 21 is connected by way of a gas duct 22, arranged in the steering wheel 4 and in the first section 7 of the steering column, to the aforementioned working chamber 13, and together therewith forms a drive device intended to act upon the steering column 5.

When the gas generator 21 is activated in a collision in order to inflate the airbag 20, gas from the gas generator will be fed by way of the gas duct 22 to the working chamber 13, where such a high pressure prevails that the locking function of the first locking device 16 is overcome and the first part 9 in the holder 6 is displaced axially away from the second part 10 fixed to the vehicle. This brings the first section 7 of the steering column 5 and the steering wheel 4 mounted thereon with it, so that these come closer to the driver of the vehicle. This displacement is shown in FIG. 2. This displacement movement of the steering wheel 4 described may be performed in a purely axial direction without altering the orientation of the steering column 5, which can be achieved by mounting the holder 6 in the vehicle so that it does not alter its orientation during movement. According to the invention, however, it is advantageous if the steering wheel, is not only displaced toward the driver but also lowered somewhat.

One simple way of achieving this is shown in FIGS. 1 and 2, in which the holder 6 is mounted so that it can swivel about an axis 23 fitted in the mounting 2 and extending transversely to the steering column 5. The steering column 5 can hereby be swivelled about the axis 23, that is to say in a vertical plane through the longitudinal direction of the steering column. In a normal position according to FIG. 1, however, the holder 6 is fixed in relation to the mounting 2 and the steering box 3, by means of a locking device 24, which in this case according to FIG. 2 consists of a pin 25, axially fitted on the first part 9 of the holder 6 and intended for engagement with a corresponding recess 26 in the mounting 2.

As will be seen from FIG. 2, the first part 9 of the holder 6 is provided with a fixed section 27, which faces the steering wheel 4 and is intended to interact with a corresponding fixed section 28 in the vehicle, in this case on the mounting 2. When the first section 7 of the steering column is displaced from the normal position shown in FIG. 1 by means of gas from the gas generator 21, together with the first part 9 of the holder 6, the locking by means of the locking device 24 will be rapidly overcome, following which the interacting, bevelled sections 27 and 28 force the steering column 5 to swing downward, at the same time that the steering wheel 4 is moved toward the driver. The movement is stopped at the position shown in FIG. 2, when the second locking device 17 comes into play. The generation of gas by the gas generator 21 has suitably ceased in this position, and the second locking device 17 now prevents the first part 9 of the holder 6 being returned to the original position.

Figure 3:
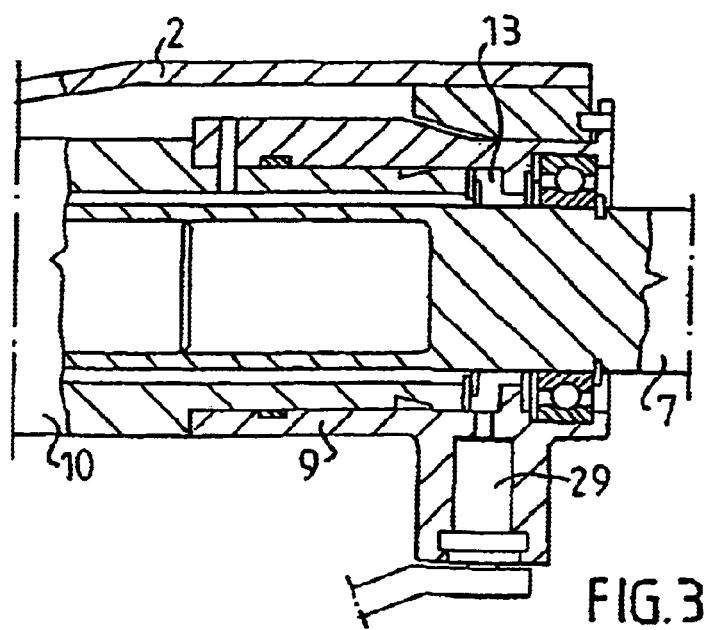
FIG. 3 shows a section of a modified steering wheel arrangement in the normal position.

FIG. 3 shows a modified embodiment, in which the working chamber 13, instead of being supplied with gas from the gas generator 21 belonging to the airbag 20 in the steering wheel, is supplied with gas from its own gas generator 29, which is fitted to the first part 9 of the holder 6. Such an arrangement makes it possible to activate this gas generator 29 when necessary and the airbag gas generator 21 at different times, for example in order to commence movement of the steering column and steering wheel before inflation of the airbag commences.

A gas generator intended for the working chamber 13 can also be located at points other than that shown, depending on needs and requirements. One possibility, for example, is in a bolt, which fixes the steering wheel to the steering column.

By selecting another location and design for the bevelled sections 27 and 28 it is possible to modify the movement pattern of the steering wheel 4 according to needs and requirements, for example so that lowering of the steering wheel occurs later than in the example shown. The downward turning of the steering column 5 may also be achieved in some way other than by means of the bevelled sections 27, 28. One possibility, for example, is to force the steering column to swing downward with the aid of an operating element in the form of a compression spring or gas cylinder, for example, which is activated at a suitable point in time.

A suitable magnitude for the axial displacement of the steering wheel is approximately 30–50 mm, suitably about 40 mm, for example. Displacement of the steering wheel and inflation of the airbag should suitably be completed in no more than approximately 50 ms from the start of the collision in order to effectively arrest and protect the driver.

The steering wheel arrangement 1 described above may also advantageously permit individual adjustment of the steering wheel by conventional means in that the steering wheel, before driving, can be shifted toward or away from the driver and either raised or lowered, before being locked in the desired position for the present driver. Such embodiments are familiar to the person skilled in the art and will therefore not be described further in this context.

What is claimed is:

1. A steering wheel arrangement in a motor vehicle, in which a steering column (5) provided with a steering wheel (4) is pivotally supported in a holder (6) arranged in the vehicle, and in which the steering wheel together with a first section (7) of the steering column is (designed, in the event of a collision, to be moved from a normal position to a crash position closer to the driver of the vehicle by means of a drive device acting on the first section (7) of the steering column, characterized in that the drive device comprises a working chamber (13) intended to act upon the first section (7) of the steering column, and located around said first section, to which chamber a gas generator (21, 29) is connected, which is designed to be activated in the event of a collision in order to deliver propellant gas to the working chamber (13), thereby moving the first section (7) of the steering column and the steering wheel (4) to a crash position closer to the driver of the vehicle, the holder (6) comprising a first and a second part (9, 10), which are telescopically inserted one inside the other and tightly enclose the first section (7) of the steering column (5), and together with the first section (7) form the working chamber (13), the first part (9) being axially locked relative to the first section (7) of the steering column and the second part (10) being anchored in the vehicle, and that the holder (6) is mounted so that it can swivel in a vertical plane through the logitudinal direction of the steering column (5), and is designed to be turned in conjunction with axial displacement of the first section (7) of the steering column, so that the steering wheel (4) is lowered.

2. The steering wheel arrangement as claimed in claim 1, characterized in that the first part (9) of the holder (6) is provided with a bevelled section (27), which interacts with a corresponding bevelled section (28) in the vehicle, the bevelled sections (27, 28) being arranged so that, in the event of axial displacement of the first part (9) of the holder, the holder (6) is turned downward, thereby lowering the steering wheel.

3. The steeling wheel arrangement as claimed in claim 1, characterized in that the holder (6) is acted upon by an operating element, which is designed, after a predetermined axial displacement of the first section (7) of the steering column, to turn the holder (8) so that the steering wheel is lowered.

4. The steering wheel arrangement as claimed in claim 1, characterized in that an airbag (20) with associated gas generator (21) is fitted in the steering wheel (4) of the vehicle, and in that in the steering column (5) there is a gas duct (22) running between the gas generator (21) and the working chamber (13).

5. The steering wheel arrangement as claimed in claim 1, characterized in that the second part (10) of the holder (6) is inserted in the first part (9) of the holder.

6. The steering wheel arrangement as claimed in claim 1, characterized in that between the first and second part (9, 10) of the holder (6) there is a first locking device (16) in order to prevent movement between the first and the second part before activation of the gas generator (21, 29).

7. The steering wheel arrangement as claimed in claim 6, characterized in that between the first and second part (9, 10) of the holder (6) there is a second locking device (17), which in a predetermined separated position between the first and the second parts (9, 10) prevents telescoping between said parts.

* * * * *

UNITED STATES PATENT AND TRADEMARK OFFICE
CERTIFICATE OF CORRECTION

PATENT NO.    : 6,910,715 B2
DATED         : June 28, 2005
INVENTOR(S)   : Lars-Ove Andersson It is certified that error appears in the above-identified patent and that said Letters Patent is hereby corrected as shown below:

<u>Title page,</u>
Item [73], Assignee, should read -- Saab Automobile AB (SE) --.

Signed and Sealed this

Thirtieth Day of August, 2005

JON W. DUDAS
*Director of the United States Patent and Trademark Office*